(12) United States Patent
Akai et al.

(10) Patent No.: US 12,435,173 B2
(45) Date of Patent: Oct. 7, 2025

(54) UNSATURATED POLYESTER RESIN COMPOSITION, MOLDING MATERIAL, AND MOLDED ARTICLE

(71) Applicant: JAPAN COMPOSITE CO., LTD., Tokyo (JP)

(72) Inventors: Ikuo Akai, Shizuoka (JP); Masahiro Hakotani, Shizuoka (JP); Takashi Tsukamoto, Shizuoka (JP)

(73) Assignee: JAPAN COMPOSITE CO., LTD., Tokyo (JP)

(*) Notice: Subject to any disclaimer, the term of this patent is extended or adjusted under 35 U.S.C. 154(b) by 357 days.

(21) Appl. No.: 17/773,086

(22) PCT Filed: Nov. 9, 2020

(86) PCT No.: PCT/JP2020/041744
§ 371 (c)(1),
(2) Date: Apr. 29, 2022

(87) PCT Pub. No.: WO2021/095688
PCT Pub. Date: May 20, 2021

(65) Prior Publication Data
US 2024/0141090 A1    May 2, 2024

(30) Foreign Application Priority Data
Nov. 12, 2019  (JP) ................. 2019-204865

(51) Int. Cl.
C08F 283/01    (2006.01)
C08K 3/22    (2006.01)
C08K 7/14    (2006.01)

(52) U.S. Cl.
CPC .............. *C08F 283/01* (2013.01); *C08K 3/22* (2013.01); *C08K 7/14* (2013.01); *C08K 2003/2227* (2013.01)

(58) Field of Classification Search
None
See application file for complete search history.

(56) References Cited

U.S. PATENT DOCUMENTS

| 4,853,279 A | * | 8/1989 | Shibata | C08F 299/026 523/400 |
| 2010/0069548 A1 | * | 3/2010 | Jansen | C08F 299/04 524/302 |
| 2021/0139629 A1 | | 5/2021 | Akai et al. | |

FOREIGN PATENT DOCUMENTS

| JP | 8-295714 A | 11/1996 |
| JP | 10-46035 A | 2/1998 |
| JP | 4102379 | * 10/2006 |
| WO | 2019/198641 A1 | 10/2019 |
| WO | 2020/162288 A1 | 8/2020 |

OTHER PUBLICATIONS

Machine translation of Kikuchi et al. JP 4102379 (Year: 2008).*

* cited by examiner

*Primary Examiner* — Robert T Butcher
(74) *Attorney, Agent, or Firm* — RANKIN, HILL & CLARK LLP

(57) ABSTRACT

An unsaturated polyester resin composition contains an unsaturated polyester, a vinyl ester, a polymerizable monomer, and an aluminum hydroxide. The vinyl ester is a reaction product of an epoxy resin and an unsaturated monobasic acid. The vinyl ester is blended in a predetermined ratio to the unsaturated polyester. The aluminum hydroxide is blended in a predetermined ratio to the vinyl ester.

5 Claims, No Drawings

UNSATURATED POLYESTER RESIN COMPOSITION, MOLDING MATERIAL, AND MOLDED ARTICLE

The present invention relates to an unsaturated polyester resin composition, a molding material, and a molded article, and in particular to an unsaturated polyester resin composition, a molding material containing the unsaturated polyester resin composition, and a molded article including a cured product of the molding material.

BACKGROUND ART

Conventionally, a molded article made of a molding material including an unsaturated polyester resin (particularly, SMC (sheet molding compound)) has been used in a variety of fields due to its excellent appearance, mechanical properties, water resistance, corrosion resistance, and the like.

As the molding material, for example, a molding material including a crystalline unsaturated polyester resin, a vinyl ester resin, Softon 1200 (calcium carbonate) as a filler, and a glass fiber has been proposed (for example, Patent document 1 (Example 1) below).

CITATION LIST

Patent Document

Patent Document 1: Japanese Unexamined Patent Publication No. 8-295714

SUMMARY OF THE INVENTION

Problem to be Solved by the Invention

The molding material of Patent Document 1, however, includes calcium carbonate. Thus, there is a disadvantage that the molded article produced by using the molding material has poor flame retardancy.

To improve the flame retardancy, it is considered to blend aluminum hydroxide to the molding material. However, there is another disadvantage that the mechanical properties of the molded article are reduced when the aluminum hydroxide is blended.

Further, such a molded article may be required to have low shrinkage in order to reduce the warp or deformation.

The present invention provides an unsaturated polyester resin composition for producing a molded article with excellent flame retardancy and mechanical strength, and low shrinkage; a molding material containing the unsaturated polyester resin composition; and a molded article including a cured product of the molding material.

Means for Solving the Problem

The present invention [1] includes an unsaturated polyester resin composition including an unsaturated polyester; a vinyl ester; a polymerizable monomer; and an aluminum hydroxide, wherein the vinyl ester is a reaction product of an epoxy resin and an unsaturated monobasic acid, a mixing ratio of the vinyl ester to 100 parts by mass of the unsaturated polyester is 5 parts by mass or more and 20 parts by mass or less, and a mixing ratio (aluminum hydroxide/vinyl ester) of the aluminum hydroxide to the vinyl ester is 22 or more and 45 or less.

The present invention [2] includes the unsaturated polyester resin composition described in [1], wherein the epoxy resin is a bisphenol epoxy resin, and an epoxy equivalent of the epoxy resin is 250 g/eq or more and 350 g/eq or less.

The present invention [3] includes the unsaturated polyester resin composition described in [2], wherein the epoxy resin is a bisphenol A epoxy resin.

The present invention [4] includes the unsaturated polyester resin composition described in any one of the above-described [1] to [3], further including a flame retardant.

The present invention [5] includes a molding material including: the unsaturated polyester resin composition described in any one of the above-described [1] to [4]; and a reinforced fiber.

The present invention [6] includes a molded article including: a cured product of the molding material described in [5].

Effects of the Invention

The unsaturated polyester resin composition of the present invention contains the vinyl ester in a predetermined mixing ratio to the unsaturated polyester.

Thus, the molded article produced by using the unsaturated polyester resin composition has excellent mechanical properties (flexure properties and tensile properties) and low shrinkage.

The unsaturated polyester resin composition contains the aluminum hydroxide in a predetermined mixing ratio to the vinyl ester.

Thus, the molded article produced by using the unsaturated polyester resin composition has excellent flame retardancy and excellent mechanical properties (flexure properties and tensile properties).

The molding material of the present invention contains the unsaturated polyester resin composition of the present invention. Thus, the molded article produced by using the molding material has excellent flame retardancy and mechanical strength (flexure properties and tensile properties), and low shrinkage.

The molded article of the present invention includes a cured product of the molding material of the present invention, and thus has excellent flame retardancy and mechanical strength (flexure properties and tensile properties), and low shrinkage.

DESCRIPTION OF THE EMBODIMENTS

The unsaturated polyester resin composition of the present invention contains an unsaturated polyester, a vinyl ester, a polymerizable monomer, and an aluminum hydroxide.

The unsaturated polyester is a polymerization product of a polybasic acid and a polyhydric alcohol.

The polybasic acid contains a polybasic acid having an ethylenically unsaturated double bond (hereinafter, referred to as an ethylenically unsaturated bond-containing polybasic acid) as an essential component, and a polybasic acid that does not have an ethylenically unsaturated double bond (hereinafter, referred to as an ethylenically unsaturated bond-free polybasic acid) as an optional component.

Examples of the ethylenically unsaturated bond-containing polybasic acid include ethylenically unsaturated aliphatic dibasic acids such as maleic acid, fumaric acid, itaconic acid, dihydromuconic acid, halides of these acids, and alkyl esters of these acids.

Further, examples of the ethylenically unsaturated bond-containing polybasic acid include acid anhydrides derived from the above-described ethylenically unsaturated aliphatic dibasic acid, and maleic anhydrides.

As the ethylenically unsaturated bond-containing polybasic acid, preferably, a maleic anhydride and a fumaric acid are used.

Examples of the ethylenically unsaturated bond-free polybasic acid include saturated aliphatic polybasic acids, saturated alicyclic polybasic acids, aromatic polybasic acids, halides of these acids, and alkyl esters of these acids.

Examples of the saturated aliphatic polybasic acid include saturated aliphatic dibasic acids such as oxalic acid, malonic acid, succinic acid, methylsuccinic acid, 2,2-dimethylsuccinic acid, 2,3-dimethylsuccinic acid, hexylsuccinic acid, glutaric acid, 2-methylglutaric acid, 3-methylglutaric acid, 2,2-dimethylglutaric acid, 3,3-dimethylsuccinic acid, adipic acid, pimelic acid, suberic acid, azelaic acid, and sebacic acid.

Also, examples of the saturated aliphatic polybasic acid include acid anhydrides derived from the above-described saturated aliphatic dibasic acids, for example, oxalic anhydrides, and succinic anhydrides.

Examples of the saturated alicyclic polybasic acid include saturated alicyclic dibasic acids such as HET acid, 1,2-hexahydrophthalic acid, 1,1-cyclobutanedicarboxylic acid, 1,4-cyclohexanedicarboxylic acid (cis- or trans-1,4-cyclohexanedicarboxylic acid or a mixture thereof), and dimer acid.

Further, examples of the saturated alicyclic polybasic acid include acid anhydrides derived from the above-described saturated alicyclic dibasic acids, for example, HET acid anhydrides.

Examples of the aromatic polybasic acid include aromatic dibasic acids such as phthalic acid (orthophthalic acid, isophthalic acid, and terephthalic acid), trimellitic acid, and pyromellitic acid.

Further, examples of the aromatic polybasic acid include acid anhydrides derived from the above-described aromatic dibasic acid, for example, phthalic anhydrides.

As the ethylenically unsaturated bond-free polybasic acid, preferably, an aromatic polybasic acid, more preferably, an aromatic dibasic acid, further more preferably, a phthalic acid, particularly preferably, an isophthalic acid is used.

These polybasic acids can be used alone or in combination of two or more.

Preferably, the polybasic acid includes only an ethylenically unsaturated bond-containing polybasic acid.

Examples of the polyhydric alcohol include alkanediols such as ethylene glycol, propylene glycol (1,2- or 1,3-propanediol or a mixture thereof), butylene glycol (1,2-, 1,3-, or 1,4-butylene glycol or a mixture thereof), 1,5-pentanediol, 1,6-hexanediol, neopentyl glycol, 2-methyl-1,3-propanediol, 2-butyl-2-ethyl-1,3-propanediol, 3-methyl-1,5-pentanediol, 2,2,2-trimethylpentanediol, and 3,3-dimethylolheptane; aliphatic diols such as ether diols including diethylene glycol, triethylene glycol, and dipropylene glycol; alicyclic diols such as cyclohexanediol (1,2-, 1,3-, or 1,4-cyclohexanediol or a mixture thereof), cyclohexanedimethanol (1,2-, 1,3-, or 1,4-cyclohexanedimethanol or a mixture thereof), cyclohexanediethanol (1,2-, 1,3-, or 1,4-cyclohexanediethanol or a mixture thereof), and hydrogenated bisphenol A; dihydric alcohols such as aromatic diols including bisphenol A, ethylene oxide adduct of bisphenol A, and propylene oxide adduct of bisphenol A; trihydric alcohols such as glycerin, trimethylolpropane, and triisopropanolamine; tetrahydric alcohols such as tetramethylolmethane (pentaerythritol) and diglycerin; pentahydric alcohols such as xylitol; and hexahydric alcohols such as sorbitol, mannitol, allitol, iditol, darcitol, altritol, inositol, and dipentaerythritol. Preferably, a dihydric alcohol, more preferably, an aliphatic diol, further more preferably, alkanediol, particularly preferably, propylene glycol and neopentyl glycol are used.

These polyhydric alcohols may be used alone or in combination of two or more. Preferably, the polyhydric alcohol includes propylene glycol and neopentyl glycol.

The unsaturated polyester is obtained by polycondensation (condensation polymerization) of a polybasic acid with a polyhydric alcohol.

In order to subject the polybasic acid and the polyhydric alcohol to the polycondensation (condensation polymerization), the polybasic acid and the polyhydric alcohol are blended so as to have an equivalent ratio (hydroxyl group of the polyhydric alcohol/carboxyl group of the polybasic acid) of the polyhydric alcohol to the polybasic acid of, for example, 0.9 or more, preferably 0.95 or more, and for example, 1.2 or less, preferably 1.1 or less, and the obtained mixture is stirred at a normal pressure under a nitrogen atmosphere.

The reaction temperature is, for example, 150° C. or more, preferably 190° C. or more, and, for example, 250° C. or less, preferably 230° C. or less.

The reaction time is, for example, 8 hours or more, and, for example, 30 hours or less.

In the above-described reaction, if necessary, a known solvent and a known catalyst may be also blended thereto.

In this manner, an unsaturated polyester is obtained.

The unsaturated polyester has an acid value (measurement method: in conformity with JIS K6901 (2008)) of, for example, 20 mgKOH/g or more, preferably 25 mgKOH/g or more and below 40 mgKOH/g, preferably 30 mgKOH/g or less.

The unsaturated polyester has a weight average molecular weight of, for example, 4000 or more, preferably 6000 or more, and, for example, 25000 or less, preferably 20000 or less.

The weight average molecular weight is a weight average molecular weight in terms of polystyrene by GPC (gel permeation chromatography), and can be determined by GPC measurement of the unsaturated polyester.

The mixing ratio of the unsaturated polyester to 100 parts by mass of the total amount of the unsaturated polyester, vinyl ester, and polymerizable monomer is, for example, 30 parts by mass or more, and, for example, 60 parts by mass or less.

The vinyl ester is a reaction product of an epoxy resin and an unsaturated monobasic acid.

Examples of the epoxy resin include bisphenol epoxy resins and novolac-type epoxy resins.

Examples of the bisphenol epoxy resin include a reaction product of a phenol component such as a bisphenol compound (for example, bisphenol A) and an epoxy component of a bisphenol A epoxy compound.

The bisphenol epoxy resin is represented by the following general formula (1).

[Chemical formula 1]

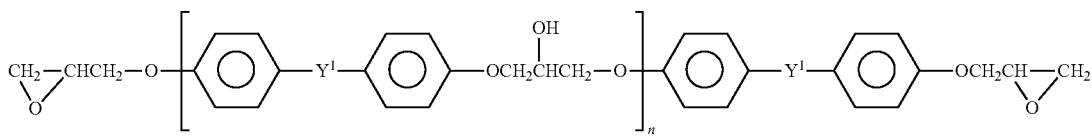

(In the formula, $Y^1$ represents any of $-C(CH_3)_2-$, $-CH_2-$, $-O-$, $-S-$, and $-(O=S=O)-$, and "n" represents an integer of 0 to 5.) Examples of the bisphenol epoxy resin include bisphenol A epoxy resin, bisphenol F epoxy resin, and bisphenol S epoxy resin. Preferably, a bisphenol A epoxy resin is used.

When the bisphenol epoxy resin is a bisphenol A epoxy resin, the mechanical strength (tensile properties (tensile strength)) of the molded article (described below) produced by using the unsaturated polyester resin composition can be improved.

The bisphenol epoxy resin has an epoxy equivalent of, for example, 100 g/eq or more, preferably 250 g/eq or more, and, for example, 800 g/eq or less, preferably 400 g/eq or less, more preferably 350 g/eq or less.

When the above-described epoxy equivalent is the above-described lower limit or more, the mechanical strength (flexural properties and tensile properties) of the molded article (described below) produced by using the unsaturated polyester resin composition can be improved.

When the above-described epoxy equivalent is the above-described upper limit or less, the mechanical strength (flexural properties and tensile properties) of the molded article (described below) produced by using the unsaturated polyester resin composition can be improved.

When two types of the bisphenol epoxy resins are used in combination, the above-described epoxy equivalent is an epoxy equivalent of all the bisphenol epoxy resins obtained by multiplying the epoxy equivalent of each of the bisphenol epoxy resins by the mass ratio of each of the bisphenol epoxy resins to the total amount of the bisphenol epoxy resins and adding up the products of the epoxy equivalents and the mass ratios.

In the above description, the bisphenol epoxy resin is a reaction product of a phenol component and an epoxy component. Not being limited to the above, the bisphenol epoxy resin may be a reaction product of a phenol component and an epichlorohydrin. Preferably, the bisphenol epoxy resin is a reaction product of a phenol component and an epoxy component.

The novolac-type epoxy resin is, for example, a reaction product of a novolac and an epichlorohydrin.

The novolac-type epoxy resin is represented by the following general formula (2).

[Chemical formula 2]

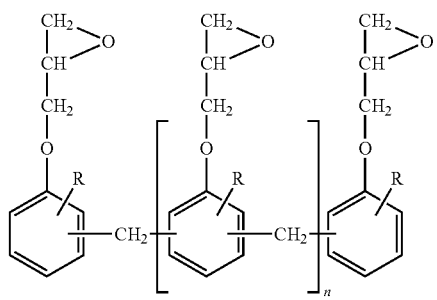

(In the formula, R represents one of $-H$ and $-CH_3$, and "n" represents an integer of 0 to 5.) Examples of the novolac-type epoxy resin include phenol novolac-type epoxy resin (in the above-described general formula (2), R represents $-H$), and cresol novolac-type epoxy resin (in the above-described general formula (2), R represents $-CH_3$.) Preferably, a phenol novolac-type epoxy resin is used.

The novolac-type epoxy resin has an epoxy equivalent of, for example, 100 g/eq or more, and, for example, 800 g/eq or less, preferably 400 g/eq or less, more preferably 350 g/eq or less, even more preferably 200 g/eq or less.

Alternatively, a commercially available product can be used as the epoxy resin. An epoxy resin of which chain is extended by a phenol compound can be used.

Examples of the unsaturated monobasic acid include monocarboxylic acids such as (meth)acrylic acid, crotonic acid, cinnamic acid, and sorbic acid, and a reaction product of a dibasic acid anhydride and an alcohol having at least one unsaturated group in a molecule. Used herein, the "(meth)acryl" refers to methacryl and/or acryl.

Examples of the dibasic acid anhydride include maleic anhydride, succinic anhydride, phthalic anhydride, tetrahydrophthalic anhydride, and hexahydrophthalic anhydride.

Examples of the alcohol having an unsaturated group include hydroxyethyl (meth)acrylate, hydroxypropyl (meth)acrylate, hydroxybutyl (meth)acrylate, pentaerythritol tri(meth)acrylate, and glycerin di(meth)acrylate.

These unsaturated monobasic acids may be used alone or in combination of two or more.

As the unsaturated monobasic acid, preferably, monocarboxylic acid, more preferably, (meth)acrylic acid, even more preferably, methacrylic acid is used.

To obtain the vinyl ester, the epoxy resin and the unsaturated monobasic acid are reacted.

In the above-described reaction, an addition reaction of the epoxy group of the epoxy resin and the unsaturated monobasic acid occurs.

In the above-described reaction, an equivalent of the carboxyl group of the unsaturated monobasic acid with respect to the epoxy group of the epoxy resin is, for example, 0.8 or more, preferably 1.0 or more, and, for example, 1.5 or less, preferably 1.2 or less.

Examples of the catalyst include amines such as triethylamine and benzyldimethylamine; ammonium salts such as tetramethylammonium chloride and triethylbenzylammonium chloride; imidazoles such as 2-ethyl-4-imidazole; amides; pyridines; phosphines such as triphenylphosphine; phosphonium salts such as tetraphenylphosphonium bromide and ethyltriphenylphosphonium bromide; sulfonium salts; sulfonic acids; and organic metal salts such as zinc octylate, and preferably, an ammonium salt, more preferably, a triethylbenzylammonium chloride is used.

A mixing ratio of the catalyst to 100 parts by mass of the epoxy resin is, for example, 0.01 parts by mass or more, preferably 0.05 parts by mass or more, and, for example, 0.5 parts by mass or less, preferably 0.1 parts by mass or less.

In the above-described reaction, if necessary, a polymerization inhibitor (described later) (preferably, hydroquinone)) can be blended thereto.

A mixing ratio of the polymerization inhibitor to 100 parts by mass of the epoxy resin is, for example, 0.01 parts by mass or more, preferably 0.05 parts by mass or more, and, for example, 0.5 parts by mass or less, preferably 0.1 parts by mass or less.

The reaction conditions include a reaction temperature of, for example, 80° C. or more, preferably 100° C. or more, and, for example, 150° C. or less, preferably 130° C. or less, and a reaction time of, for example, 1 hour or more, preferably 2 hours or more, and, for example, 10 hours or less.

The above-described reaction can also be carried out subsequently to the above-described reaction of the phenol component and epoxy component.

In this manner, a vinyl ester is produced.

The vinyl ester has an acid value (measurement method: in conformity with JIS K6901 (2008)) of, for example, 1 mgKOH/g or more and 20 mgKOH/g or less, preferably 10 mgKOH/g or less.

A mixing ratio of the vinyl ester to 100 parts by mass of the total amount of the unsaturated polyester, vinyl ester, and polymerizable monomer is, for example, 5 parts by mass or more, and, for example, 20 parts by mass or less, preferably 10 parts by mass or less.

A mixing ratio of the vinyl ester to 100 parts by mass of the unsaturated polyester is, 5 parts by mass or more, preferably 10 parts by mass or more, and, for example, 20 parts by mass or less.

When the mixing ratio of the vinyl ester is the above-described lower limit or more, the mechanical strength (flexural properties and tensile properties) of the molded article (described below) produced by using the unsaturated polyester resin composition can be improved.

When the mixing ratio of the vinyl ester is less than the above-described lower limit, the mechanical strength (flexural properties and tensile properties) of the molded article (described below) produced by using the unsaturated polyester resin composition is reduced.

When the mixing ratio of the vinyl ester is the above-described upper limit or less, the molded article (described below) produced by using the unsaturated polyester resin composition has low shrinkage.

When the mixing ratio of the vinyl ester is more than the above-described upper limit, the low shrinkage of the molded article (described below) produced by using the unsaturated polyester resin composition is reduced.

The polymerizable monomer is a solvent for dissolving the unsaturated polyester, and is a cross-linkable monomer (reactive diluent) cross-linkable with the unsaturated polyester at the time of curing of the unsaturated polyester resin (described later). Examples thereof include styrene-based monomers such as styrene, α-methyl styrene, α-ethyl styrene, vinyltoluene, t-butylstyrene, and chlorostyrene; alkyl (meth)acrylates such as methyl (meth)acrylate, ethyl (meth)acrylate, isopropyl (meth)acrylate, butyl (meth)acrylate, n-butyl (meth)acrylate, t-butyl (meth)acrylate, isobutyl (meth)acrylate, 2-ethylhexyl (meth)acrylate, lauryl (meth)acrylate, tridecyl (meth)acrylate, and stearyl (meth)acrylate; allyl (meth)acrylate esters such as allyl (meth)acrylate; cyclic structure-containing (meth)acrylates such as cyclohexyl (meth)acrylate, benzyl (meth)acrylate, isobornyl (meth)acrylate, glycidyl (meth)acrylate, tetrahydrofurfuryl (meth)acrylate, dicyclopentenyl (meth)acrylate, dicyclopentanyl (meth)acrylate, and dicyclopentenyloxyethyl (meth) acrylate; hydroxyl alkyl (meth)acrylates such as 2-hydroxyethyl (meth)acrylate and 2-hydroxypropyl (meth)acrylate; alkoxy alkyl (meth)acrylates such as 2-methoxyethyl (meth) acrylate and 2-ethoxyethyl (meth)acrylate; (meth)acrylic acid ester-based monomers such as amino alkyl (meth) acrylates including dimethyl amino ethyl (meth)acrylate and diethyl amino ethyl (meth)acrylate and chloride salts of these, and fluoroalkyl (meth)acrylates including trifluoroethyl (meth)acrylate and heptadecafluorodecyl (meth)acrylate; polyfunctional (meth)acrylates such as ethylene glycol di(meth)acrylate, diethylene glycol di(meth)acrylate, trimethylolpropane tri(meth)acrylate, pentaerythritol tetra(meth) acrylate, and dipentaerythritol hexa(meth)acrylate; and allyl-based monomers such as glycerin monoallyl ether, pentaerythritol diallyl ether, pentaerythritol monoallyl ether, and trimethylolpropane monoallyl ether. Preferably, a styrene-based monomer, more preferably, a styrene is used.

These polymerizable monomers may be used alone or in combination of two or more.

A mixing ratio of the polymerizable monomer to 100 parts by mass of the total amount of the unsaturated polyester, vinyl ester, and polymerizable monomer is, for example, 30 parts by mass or more, preferably 40 parts by mass or more, and, for example, 60 parts by mass or less.

A mixing ratio of the polymerizable monomer to 100 parts by mass of the unsaturated polyester is, for example, 50 parts by mass or more, preferably 100 parts by mass or more, and, for example, 200 parts by mass or less, preferably 130 parts by mass or less.

A mixing ratio of the polymerizable monomer to 100 parts by mass of the vinyl ester 1 is, for example, 500 parts by mass or more, preferably 700 parts by mass or more, and, for example, 1000 parts by mass or less, preferably 800 parts by mass or less.

The aluminum hydroxide is blended to give flame retardancy, and give transparency and color depth to the molded article (described later) produced by using the unsaturated polyester resin composition.

The aluminum hydroxide has an average particle size of, for example, 1 μm or more, and, for example, 50 μm or less, preferably 25 μm or less.

The average particle size of the aluminum hydroxide can be determined by preparing a particle size distribution curve with a laser diffraction-scattering particle size distribution measurement device and calculating the particle size corresponding to 50% by mass.

The aluminum hydroxide may be used alone or in combination of two or more of aluminum hydroxide having a different average particle size and aluminum hydroxide having different sodium oxide content.

A mixing ratio of the aluminum hydroxide to 100 parts by mass of the total amount of the unsaturated polyester, vinyl ester, and polymerizable monomer is, for example, 100 parts by mass or more, preferably 150 parts by mass or more, and, for example, 300 parts by mass or less, preferably 250 parts by mass or less.

A mixing ratio of the aluminum hydroxide to 100 parts by mass of the unsaturated polyester is, for example, 300 parts by mass or more, preferably 400 parts by mass or more, and, for example, 700 parts by mass or less, preferably 600 parts by mass or less.

A mixing ratio (aluminum hydroxide/vinyl ester) of the aluminum hydroxide to the vinyl ester is, 22 or more, and, 45 or less, preferably 30 or less.

When the above-described mixing ratio is the above-described lower limit or more, the flame retardancy of the molded article (described below) produced by using the unsaturated polyester resin composition is improved.

When the above-described mixing ratio is less than the above-described lower limit, the flame retardancy of the molded article (described below) produced by using the unsaturated polyester resin composition is reduced.

When the above-described mixing ratio is the above-described upper limit or less, the mechanical strength (flexural properties and tensile properties) of the molded article (described below) produced by using the unsaturated polyester resin composition is improved.

When the above-described mixing ratio is more than the above-described upper limit, the mechanical strength (flexural properties and tensile properties) of the molded article (described below) produced by using the unsaturated polyester resin composition is reduced. Simultaneously, the linear expansion coefficient of the molded article (described below) is reduced. When the molded article is used in combination with light metal, the dimensional stability is poor due to the difference between the linear expansion coefficient of the molded article (described below) and that of the light metal (for example, aluminum).

Further, the unsaturated polyester resin composition is obtained by blending an unsaturated polyester, a vinyl ester, a polymerizable monomer, and an aluminum hydroxide in the above-described mixing ratio.

In this manner, an unsaturated polyester resin composition is produced.

In the unsaturated polyester resin composition, a mixing ratio of the unsaturated polyester to the unsaturated polyester resin composition is, for example, 5% by mass or more, preferably 10% by mass or more, and, for example, 20% by mass or less. A mixing ratio of the vinyl ester to the unsaturated polyester resin composition is, for example, 1% by mass or more, and, for example, 10% by mass or less, preferably 5% by mass or less. A mixing ratio of the polymerizable monomer to the unsaturated polyester resin composition is, for example, 10% by mass or more, and, for example, 30% by mass or less, preferably 20% by mass or less. A mixing ratio of the aluminum hydroxide to the unsaturated polyester resin composition is, for example, 50% by mass or more, and, for example, 70% by mass or less. The total amount of the unsaturated polyester, vinyl ester, and polymerizable monomer with respect to the unsaturated polyester resin composition is, for example, 20% by mass or more, preferably 30% by mass or more, and, for example, 50% by mass or less, preferably 40% by mass or less. The total amount of the unsaturated polyester, vinyl ester, polymerizable monomer, and aluminum hydroxide with respect to the unsaturated polyester resin composition is, for example, 60% by mass or more, preferably 70% by mass or more, more preferably 80% by mass or more, and, for example, 99.9% by mass or less.

As necessary, a flame retardant can be blended to the unsaturated polyester resin composition.

When the unsaturated polyester resin composition contains a flame retardant, flame retardancy can be given to the molded article (described below) produced by using the unsaturated polyester resin composition.

Examples of the flame retardant include halogen flame retardants such as a bromine-based flame retardant, and non-halogen flame retardants such as a phosphorus-based flame retardant, an inorganic flame retardant, and a nitrogen compound-based flame retardant. Preferably, a non-halogen flame retardant, more preferably, a phosphorus-based flame retardant is used.

Further, as the phosphorus-based flame retardant, a commercially available product can be used, and specifically, examples thereof include the Exolit AP series (specifically, Exolit AP422 (ammonium polyphosphate)), the OP series (specifically, Exolit OP1230 (phosphinic acid metal salt)), the RP series (manufactured by Clariant Japan K.K.), and the FP series (specifically, the FP-2500S phosphorus-based) (manufactured by ADEKA CORPORATION).

A mixing ratio of the flame retardant to 100 parts by mass of the total amount of the unsaturated polyester, vinyl ester, and polymerizable monomer is, for example, 1 part by mass or more, preferably 5 parts by mass or more, and, for example, 50 parts by mass or less, preferably 20 parts by mass or less.

As necessary, additives such as a low profile agent, a polymerization inhibitor, a curing agent, a release agent, a coloring agent, a filler, a wetting and dispersing agent, and a thickening agent can be blended to the unsaturated polyester resin composition. These additives may be used alone or in combination of two or more.

The low profile agent is blended to suppress the cure shrinkage and thermal shrinkage of the molded article (described below) when the molded article (described below) is produced by using the unsaturated polyester resin composition.

Examples of the low profile agent include polyethylene, polystyrene, styrene thermoplastic elastomer, cross-linked polystyrene, polyvinyl acetate-polystyrene block copolymer, polyvinyl acetate, polymethylmethacrylate, and saturated polyester resin. Preferably, polyethylene, polystyrene, polyvinyl acetate, and saturated polyester resin are used.

The saturated polyester resin is produced by dissolving saturated polyester in the above-described polymerizable monomer.

The saturated polyester is a polymerization product of the above-described ethylenically unsaturated bond-free polybasic acid and the above-described polyhydric alcohol.

As the ethylenically unsaturated bond-free polybasic acid, preferably, saturated aliphatic polybasic acid and aromatic polybasic acid, more preferably, saturated aliphatic dibasic acid and aromatic dibasic acid, even more preferably, adipic acid and isophthalic acid are used.

These ethylenically unsaturated bond-free polybasic acids may be used alone or in combination of two or more.

As the polyhydric alcohol, preferably, dihydric alcohol, more preferably, neopentyl glycol is used.

These polyhydric alcohols may be used alone or in combination of two or more.

The saturated polyester is obtained by polycondensation (condensation polymerization) of the ethylenically unsaturated bond-free polybasic acid and the polyhydric alcohol.

To carry out polycondensation (condensation polymerization) of the ethylenically unsaturated bond-free polybasic acid and the polyhydric alcohol, polybasic acid is blended with polyhydric alcohol so that the equivalent ratio (hydroxyl group of polyhydric alcohol/carboxyl group of polybasic acid) of the polyhydric alcohol to the polybasic acid is, for example, 0.9 or more, preferably 0.95 or more, and, for example, 1.2 or less, preferably 1.1 or less, and the mixture is stirred under normal pressure in nitrogen atmosphere.

The reaction temperature is, for example, 150° C. or more, preferably 190° C. or more, and, for example, 250° C. or less, preferably 230° C. or less.

The reaction time is, for example, 8 hours or more, and, for example, 30 hours or less.

In the above-described reaction, as necessary, a known solvent and a known catalyst can also be blended thereto.

In this manner, the saturated polyester is produced.

The saturated polyester has an acid value (measurement method: in accordance with JIS K6901 (2008)) of, for example, 5 mgKOH/g or more and less than 40 mgKOH/g.

Then, the saturated polyester is dissolved in the above-described polymerizable monomer (preferably, styrene), and as necessary, an additive (polymerization inhibitor (described later) (preferably, hydroquinone)) is added to prepare a saturated polyester resin.

In preparation of the saturated polyester resin, a mixing ratio of the polymerizable monomer to 100 parts by mass of the saturated polyester is, for example, 35 parts by mass or more, and, for example, 150 parts by mass or less. A mixing ratio of the polymerization inhibitor to 100 parts by mass of the saturated polyester is, for example, 0.001 parts by mass or more, preferably 0.005 parts by mass or more, and, for example, 0.1 parts by mass or less, preferably 0.05 parts by mass or less.

These low profile agents may be used alone or in combination of two or more.

A mixing ratio of the low profile agent to 100 parts by mass of the total amount of the unsaturated polyester, vinyl ester, and polymerizable monomer is 5 parts by mass or more, preferably 10 parts by mass or more, and, for example, 30 parts by mass or less, preferably 20 parts by mass or less.

The polymerization inhibitor is blended in order to adjust the pot life and the curing reaction, and examples thereof include hydroquinone compounds such as hydroquinone, methylhydroquinone, and t-butylhydroquinone; benzoquinone compounds such as p-benzoquinone and methyl-p-benzoquinone; catechol compounds such as t-butylcatechol; phenol compounds such as 2,6-di-t-butyl-4-methylphenol and 4-methoxyphenol; and N-oxyl compounds such as 1-oxyl-2,2,6,6-tetramethylpiperidine, 1-oxyl-2,2,6,6-tetramethylpiperidine-4-ol, 4-hydroxy-2,2,6,6-tetrapiperidine-1-oxyl, 4-methoxy-2,2,6,6-tetramethylpiperidine-1-oxyl, 1-oxyl-2,2,6,6-tetramethylpiperidine-4-yl-acetate, 1-oxyl-2,2,6,6-tetramethylpiperidine-4-yl-2-ethylhexanoate, 1-oxyl-2,2,6,6-tetramethylpiperidine-4-yl-stearate, 1-oxyl-2,2,6,6-tetramethylpiperidine-4-yl-4-t-butylbenzoate, bis(1-oxyl-2,2,6,6-tetramethylpiperidine-4-yl) succinate ester, bis(1-oxyl-2,2,6,6-tetramethylpiperidine-4-yl) adipic acid ester, bis(1-oxyl-2,2,6,6-tetramethylpiperidine-4-yl) sebacate, bis(1-oxyl-2,2,6,6-tetramethylpiperidine-4-yl) n-butylmalonic acid ester, bis(1-oxyl-2,2,6,6-tetramethylpiperidine-4-yl) phthalate, bis(1-oxyl-2,2,6,6-tetramethylpiperidine-4-yl) isophthalate, bis(1-oxyl-2,2,6,6-tetramethylpiperidine-4-yl) terephthalate, bis(1-oxyl-2,2,6,6-tetramethylpiperidine-4-yl) hexahydroterephthalate, N,N'-bis(1-oxyl-2,2,6,6-tetramethylpiperidine-4-yl) adipamide, N-bis(1-oxyl-2,2,6,6-tetramethylpiperidine-4-yl) caprolactam, N-bis(1-oxyl-2,2,6,6-tetramethylpiperidine-4-yl) dodecylsuccinimide, 2,4,6-tris-[N-butyl-N-(1-oxyl-2,2,6,6-tetramethylpiperidine-4-yl)]-s-triazine, and 1-oxyl-2,2,6,6-tetramethylpiperidine-4-one. Preferably, a benzoquinone compound, more preferably, a p-benzoquinone is used.

A mixing ratio of the polymerization inhibitor to 100 parts by mass of the total amount of the unsaturated polyester, vinyl ester, and polymerizable monomer is, for example, 0.01 parts by mass or more, and, for example, 0.1 parts by mass or less.

These polymerization inhibitors may be used alone or in combination of two or more.

Examples of the curing agent include peroxides such as benzoyl peroxide, t-butyl peroxyisopropyl monocarbonate, t-amyl peroxyisopropyl monocarbonate, t-hexyl peroxyisopropyl monocarbonate, 1,1-bis(t-butyl peroxy)cyclohexane, t-butyl peroxy-2-ethylhexanoate, amylperoxy-2-ethylhexanoate, 2-ethylhexylperoxy-2-ethylhexanoate, t-butyl peroxybenzoate, t-hexyl peroxybenzoate, and t-hexyl peroxyacetate. Preferably, t-butyl peroxyisopropyl monocarbonate which is peroxyisopropyl monocarbonate, t-amyl peroxyisopropyl monocarbonate, t-hexyl peroxyisopropyl monocarbonate, and t-butyl peroxybenzoate are used.

A mixing ratio of the curing agent to 100 parts by mass of the total amount of the unsaturated polyester, vinyl ester, and polymerizable monomer is, for example, 0.5 parts by mass or more, preferably 1 part by mass or more, and, for example, 10 parts by mass or less, preferably 3 parts by mass or less.

These curing agents may be used alone or in combination of two or more.

Examples of the release agent include fatty acids such as stearic acid and lauric acid, fatty acid metal salts such as zinc stearate and calcium stearate, paraffins, liquid waxes, fluorine polymers, and silicon-based polymers, and preferably, fatty acid metal salt, more preferably, zinc stearate is used.

A mixing ratio of the release agent to 100 parts by mass of the total amount of the unsaturated polyester, vinyl ester, and polymerizable monomer is, for example, 1 part by mass or more, preferably 3 parts by mass or more, and, for example, 10 parts by mass or less.

These release agents may be used alone or in combination of two or more.

Examples of the coloring agent include, without particular limitation, for example, titanium oxide, polyester toner (titanium oxide and/or carbon black-containing polyester coloring agent). Preferably, polyester toner is used.

A mixing ratio of the coloring agent to 100 parts by mass of the total amount of the unsaturated polyester, vinyl ester, and polymerizable monomer is, for example, 1 part by mass or more, preferably 5 parts by mass or more, and, for example, 20 parts by mass or less.

These coloring agents may be used alone or in combination of two or more.

Examples of the filler include inorganic fillers including oxides such as alumina and titania; hydroxides such as magnesium hydroxide (excluding aluminum hydroxide); carbonates such as calcium carbonate; sulfates such as barium sulfate; silica (for example, crystalline silica, fused silica, fumed silica, dry silica (aerogel), and the like); glass powders; hollow fillers such as glass balloon, silica balloon, and alumina balloon; silicates such as silica sand, diatomaceous earth, mica, clay, kaolin, and talc; fluorides such as fluorite; phosphates such as calcium phosphate; and clay minerals such as smectite.

A mixing ratio of the filler to 100 parts by mass of the total amount of the unsaturated polyester, vinyl ester, and polymerizable monomer is, for example, 1 part by mass or more, preferably 3 parts by mass or more, and, for example, 50 parts by mass or less, preferably 30 parts by mass or less.

These fillers may be used alone or in combination of two or more.

A wetting and dispersing agent is blended so as to reduce the viscosity of the unsaturated polyester resin composition to a suitable value for heat compression molding. A known wetting and dispersing agent such as phosphoric acid polyester is used. For the wetting and dispersing agent, a commercially available product can be used, and to be specific, BYK-W996 (manufactured by BYK-Chemie) is used.

A mixing ratio of the wetting and dispersing agent to 100 parts by mass of the total amount of the unsaturated polyester, vinyl ester, and polymerizable monomer is, for example, 0.5 parts by mass or more, preferably 1 part by mass or more, and, for example, 10 parts by mass or less, preferably 3 parts by mass or less.

These wetting and dispersing agents may be used alone or in combination of two or more.

The thickener is blended so as to increase the viscosity of the unsaturated polyester resin composition to a suitable value for heat compression molding, and is preferably blended before (preferably, immediately before) impregnating the unsaturated polyester resin composition into the reinforcing fiber (described later). Examples thereof include alkaline earth metal oxides such as magnesium oxide, and alkaline earth metal hydroxides such as magnesium hydroxide and calcium hydroxide, and preferably, alkaline earth metal oxide, more preferably, magnesium oxide is used.

A mixing ratio of the thickening agent to 100 parts by mass of the total amount of the unsaturated polyester, vinyl ester, and polymerizable monomer is, for example, 0.5 parts by mass or more, and, for example, 10 parts by mass or less, preferably 3 parts by mass or less.

These thickening agents may be used alone or in combination of two or more.

Further, if necessary, an additive may be blended into the unsaturated polyester resin composition as long as it does not damage the effects of the present invention. Examples of the additive include pattern materials, antibacterial agents, hydrophilic agents, photocatalysts, ultraviolet absorbers, ultraviolet stabilizers, separation inhibitors, silane coupling agents, antistatic agents, thixotropic agents, thixo stabilizers, and polymerization accelerators. These additives may be used alone or in combination of two or more.

In the description above, the unsaturated polyester, vinyl ester, polymerizable monomer, aluminum hydroxide, fire retardant blended as necessary, and additives blended as necessary are blended to produce an unsaturated polyester resin composition. Alternatively, the unsaturated polyester is dissolved in a polymerizable monomer to prepare an unsaturated polyester resin, and thereafter, the produced unsaturated polyester resin can be blended with the vinyl ester, polymerizable monomer, aluminum hydroxide, fire retardant blended as necessary, and additives blended as necessary.

In preparation of the unsaturated polyester resin, the unsaturated polyester and polymerizable monomer are blended, and as necessary the above-described additives (for example, a polymerization inhibitor) can suitably be blended.

In preparation of the unsaturated polyester resin, a mixing ratio of the polymerizable monomer to 100 parts by mass of the unsaturated polyester is, for example, 35 parts by mass or more, and, for example, 150 parts by mass or less. A mixing ratio of the polymerization inhibitor to 100 parts by mass of the unsaturated polyester is, for example, 0.001 parts by mass or more, preferably 0.005 parts by mass or more, and, for example, 0.1 parts by mass or less, preferably 0.05 parts by mass or less.

The vinyl ester is dissolved in the polymerizable monomer, thereby preparing a vinyl ester resin. Thereafter, the prepared vinyl ester resin may be blended with the unsaturated polyester, polymerizable monomer, aluminum hydroxide, flame retardant blended as necessary, and additive blended as necessary.

In preparation of the vinyl ester resin, together with the blending of the unsaturated polyester and polymerizable monomer, as necessary, the above-described additives can appropriately be blended thereto.

In preparation of the vinyl ester resin, a mixing ratio of the polymerizable monomer to 100 parts by mass of the vinyl ester is, for example, 35 parts by mass or more, and, for example, 150 parts by mass or less.

By the above-described method, an unsaturated polyester resin and a vinyl ester resin are prepared. Thereafter, the prepared unsaturated polyester resin and vinyl ester resin are blended with the polymerizable monomer and aluminum hydroxide, flame retardant blended as necessary, and additive blended as necessary.

The unsaturated polyester resin composition produced as described above contains the vinyl ester in a predetermined ratio to the unsaturated polyester.

Thus, the molded article (described below) produced by using the unsaturated polyester resin composition has excellent mechanical properties (flexural properties and tensile properties) and low shrinkage.

The unsaturated polyester resin composition contains the aluminum hydroxide in a predetermined ratio to the vinyl ester.

Thus, the molded article (described below) produced by using the unsaturated polyester resin composition has excellent flame retardancy and excellent mechanical properties (flexural properties and tensile properties).

In other words, the unsaturated polyester resin composition contains a vinyl ester in a predetermined ratio and an aluminum hydroxide in a predetermined ratio.

Thus, the molded article (described below) produced by using the unsaturated polyester resin composition has excellent flame retardancy and mechanical strength, and low shrinkage.

A reinforced fiber is blended to the unsaturated polyester resin composition, thereby preparing a molding material. Then, a molded article can be produced from the molding material by a known method.

Examples of the reinforced fiber include inorganic fibers such as glass fiber, carbon fiber, metal fiber, and ceramics fiber; organic fibers such as poly vinyl alcohol fiber, polyester fiber, polyamide fiber, fluorine resin fiber, and phenol fiber; and natural fibers such as hemp and Kenaf. Preferably, inorganic fiber, more preferably, carbon fiber or glass fiber, even more preferably, glass fiber is used.

These examples of the reinforced fiber can be in the form of, for example, cloth such as roving cloth; mat such as chopped strand mat, preformable mat, continuous strand mat, and surfacing mat; strand such as chopped strand; roved; nonwoven fabric; and paper. Preferably, a chopped strand form is used.

Of these examples of the reinforced fiber, preferably, chopped glass strands obtained by bundling up glass fibers and cutting it into pieces with a predetermined length are used.

The length of the reinforced fiber is not particularly limited, and, is, for example, 0.1 mm or more, preferably 1.5 mm or more, more preferably 5 mm or more, even more preferably 15 mm or more, and, for example, 80 mm or less, preferably 40 mm or less.

The molding material can be produced as a sheet by, for example, impregnating the reinforced fiber with the unsaturated polyester resin composition.

A mixing ratio of the reinforced fiber (for example, when the reinforced fiber is glass fiber, hereinafter referred to as glass content ratio) to the total amount of the unsaturated polyester resin composition and reinforced fiber is, for example, 5 mass % or more, preferably 10 mass % or more, more preferably 20 mass % or more, and, for example, 50 mass % or less, preferably 40 mass % or less.

The molding material can be prepared by a known method including, for example, SMC (sheet molding compound), TMC (thick molding compound), and BMC (bulk molding compound). Preferably, SMC is used.

In this manner, a molding material including the above-described unsaturated polyester resin composition and reinforced fiber is produced.

Relative to the molding material in the above-described unsaturated polyester resin composition, the total amount (volume content rate) of the filler-excluding component excluding the aluminum hydroxide and the filler blended as necessary (specifically, the total amount of the unsaturated polyester, the vinyl ester, the polymerizable monomer, the fire retardant blended as necessary, and the addictive agents other than the filler blended as necessary) is, for example, 40 vol % or more, preferably 45 vol % or more, and, for example, 70 vol % or less, preferably 60 vol % or less.

Relative to the molding material, the volume content rate of the aluminum hydroxide is, for example, 10 vol % or more, preferably 20 vol % or more, and, for example, 30 vol % or less.

Relative to the molding material, the volume content rate of the reinforced fiber is, for example, 15 vol % or more, preferably 20 vol % or more, and, for example, 40 vol % or less, preferably 30 vol % or less.

The molding material contains the above-described unsaturated polyester resin composition. Thus, the molded article (described below) produced by using the molding material has excellent flame retardancy and mechanical strength, and low shrinkage.

To increase the viscosity of the molding material so that the molding material is ready for heat compression molding (described later), preferably, the molding material is aged, for example, at 20° C. or more and 50° C. or less for 8 hours or more and 120 hours or less.

In this manner, the molding material is formed into, for example, a sheet. That is, the molding material has a sheet shape.

The molded article can be produced by subjecting the molding material to heat compression molding by a known method.

The conditions of the heat compression molding are suitably set depending on the purpose and use, and to be specific, the molding temperature is, for example, 100° C. or more, and, for example, 200° C. or less, and the molding pressure is, for example, 0.1 MPa or more, preferably 1 MPa or more, more preferably 5 MPa or more, and, for example, 20 MPa or less, preferably 15 MPa or less.

In this manner, the molding material is molded as the molding material is cured.

In this manner, a molded article is produced.

The molded article includes a cured product of the above-described molding material, and thus has excellent flame retardancy and mechanical strength, and low shrinkage.

The molded article can widely be used for building materials, housings, casting materials, machine components (such as a battery pack housing for electric vehicles), electronic or electric components, and each component of a vehicle, a ship, an airplane, or the like.

In particular, battery pack housings for electric vehicles may be required to have excellent flame retardancy to retard the fire spread of a vehicle fire.

Further, battery pack housings for electric vehicles may also be required to have excellent mechanical strength and low shrinkage to reduce the warp or deformation.

The molded article has excellent flame retardancy and mechanical strength, and low shrinkage, and thus can suitably be used for battery pack housings for electric vehicles.

EXAMPLE

The specific numeral values used in the description below, such as mixing ratios (contents), physical property values, and parameters can be replaced with the corresponding mixing ratios (contents), physical property values, and parameters in the above-described "DESCRIPTION OF THE EMBODIMENTS", including the upper limit values (numeral values defined with "or less", and "less than") or the lower limit values (numeral values defined with "or more", and "more than"). The "parts" and "%" are based on mass unless otherwise specified.

1. Preparation of Unsaturated Polyester Resin

Synthesis Example 1

A flask equipped with a thermometer, a nitrogen introducing tube, a reflux tube, and a stirrer was charged with 10.0 mol of maleic anhydride, 6.5 mol of propylene glycol, and 4.0 mol of neopentyl glycol. The mixture was subjected to polycondensation reaction at 200° C. to 210° C. while being stirred under nitrogen gas atmosphere, thereby producing an unsaturated polyester with an acid value of 26.5 mgKOH/g. The acid value was measured by a method in accordance with JIS K6901 (2008). Relative to 100 parts by mass of the produced unsaturated polyester, 0.01 parts by mass of hydroquinone as a polymerization inhibitor and 66.7 parts by mass of styrene were added, and the mixture was stirred homogenously, thereby producing an unsaturated polyester resin (styrene content 40%).

2. Preparation of Saturated Polyester Resin

Synthesis Example 2

A flask equipped with a thermometer, a nitrogen introducing tube, a reflux tube, and a stirrer was charged with 4.0 mol of isophthalic acid and 10.5 mol of neopentyl glycol. The mixture was subjected to polycondensation reaction at 200'C to 210'C while being stirred under nitrogen gas atmosphere. Thereafter, when the acid value of the reaction product reached 10 mgKOH/g, the reaction product was cooled to 150° C., and 6.0 mol of adipic acid was charged. Then, the mixture was allowed to react again at 210° C. to 220° C., thereby producing a saturated polyester with an acid value of 9.5 mgKOH/g. Relative to 100 parts by mass of the produced saturated polyester, 0.01 parts by mass of hydroquinone as a polymerization inhibitor and 66.7 parts by mass of styrene were added, and the mixture was stirred homogenously, thereby producing an unsaturated polyester resin (styrene content 40%).

3. Preparation of Vinyl Ester Resin

Synthesis Example 3

A reaction container (flask) equipped with a stirrer, a reflux tube, and a gas introducing tube was charged with 1850 parts by mass of a bisphenol A epoxy compound (epoxy equivalent of 185 g/eq) (10.0 equivalent), 317 parts by mass of bisphenol A (2.78 equivalent), and 0.5 parts by mass of triethylbenzylammonium chloride as a catalyst. The mixture was allowed to react at 150° C. for 5 hours while nitrogen was introduced, thereby producing an epoxy resin with an epoxy equivalent of 298 g/eq. After the mixture was cooled to 120° C., 2.0 parts by mass of hydroquinone as a polymerization inhibitor, 2.0 parts by mass of triethylbenzylammonium chloride as a catalyst, and 636 parts by mass of methacrylic acid (7.40 equivalent) were added. The mixture was allowed to react at 110° C. for 8 hours while the air was introduced, thereby producing a vinyl ester with an acid value of 8.0 mgKOH/g. Next, 1869 parts by mass of styrene (66.7 parts by mass to 100 parts by mass of the vinyl ester) was added to the vinyl ester, thereby producing a vinyl ester resin with a styrene content of 40% by mass.

Synthesis Example 4

The same reaction container as used in Synthesis Example 3 was charged with 1850 parts by mass of a bisphenol A epoxy compound (epoxy equivalent of 185 g/eq) (10.0 equivalent), 477 parts by mass of bisphenol A (4.18 equivalent), and 0.5 parts by mass of triethylbenzylammonium chloride as a catalyst. The mixture was allowed to react at 150° C. for 5 hours while nitrogen was introduced, thereby producing an epoxy resin with an epoxy equivalent of 395 g/eq. After the mixture was cooled to 120° C., 2.0 parts by mass of hydroquinone as a polymerization inhibitor, 2.0 parts by mass of triethylbenzylammonium chloride as a catalyst, and 513 parts by mass of methacrylic acid (5.97 equivalent) were added thereto. The mixture was allowed to react at 110° C. for 8 hours while the air was introduced, thereby producing a vinyl ester with an acid value of 8.5 mgKOH/g. Next, 1893 parts by mass of styrene (66.7 parts by mass to 100 parts by mass of the vinyl ester) was added to the vinyl ester, thereby producing a vinyl ester resin with a styrene content of 40% by mass.

Synthesis Example 5

The same reaction container as used in Synthesis Example 3 was charged with 1800 parts by mass of phenol novolac-type epoxy resin (epoxy equivalent of 180 g/eq, average number of functional groups of 3.6) (10.0 equivalent), 2.0 parts by mass of hydroquinone as a polymerization inhibitor, 2.0 parts by mass of triethylbenzylammonium chloride as a catalyst, and 882 parts by mass of methacrylic acid (10.3 equivalent). The mixture was allowed to react at 110° C. for 8 hours while the air was introduced, thereby producing a vinyl ester with an acid value of 10.5 mgKOH/g. Next, 1788 parts by mass of styrene (66.7 parts by mass to 100 parts by mass of the vinyl ester) was added to the vinyl ester, thereby producing a vinyl ester resin with a styrene content of 40% by mass.

4. Preparation of Unsaturated Polyester Resin Composition and Molding Material

Example 1

60 parts by mass of the unsaturated polyester resin of Synthesis Example 1 (36 parts by mass of unsaturated polyester and 24 parts by mass of styrene), 10 parts by mass of the vinyl ester resin of Synthesis Example 3 (6 parts by mass of vinyl ester and 4 parts by mass of styrene), 10 parts by mass of styrene as a polymerizable monomer, 150 parts by mass of aluminum hydroxide (an average particle size of 8 μm), 15 parts by mass of a polystyrene solution as a low profile agent (35% styrene solution of polystyrene with a weight-average molecular weight of about 250000), 5 parts by mass of polyethylene powder, 0.05 parts by mass of p-benzoquinone as a polymerization inhibitor, 1 part by mass of t-butyl peroxybenzoate as a curing agent, 5 parts by mass of zinc stearate as a release agent, 10 parts by mass of black polyester toner (obtained by dispersing carbon black in a polyester resin) as a coloring agent, and 1 part by mass of polyester phosphate as a wetting and dispersing agent were mixed, thereby producing an unsaturated polyester resin composition.

0.8 parts by mass of magnesium oxide was added as a thickening agent to the unsaturated polyester resin composition. Thereafter, a chopped glass obtained by continuously a cutting glass roving into 25 mm pieces was added as a reinforced fiber so that a content rate of the glass reached 20.7% by mass. A molding material (SMC) was produced using a known SMC impregnation device, and thereafter aged at 40° C. for 48 hours. The viscosity of the molding material was increased until the molding material was ready for heat compression molding.

Examples 2 to 9 and Comparative Examples 1 to 8

A molding material was produced in the same manner as in Example 1, except that the mixing formulation was changed in accordance with Table 1 and Table 2.

In Examples 2 and 6, as a low profile agent, a polyvinyl acetate solution (40% styrene solution of polyvinyl acetate) was used.

In Example 9 and Comparative Example 7, as a flame retardant, phosphinic acid metal salt (trade name, Exolit OP1230 manufactured by Clariant International Ltd., phosphorus content 23%) was used.

In Comparative Examples 5 and 8, as a filler, calcium carbonate with an average particle size of about 3 μm was used.

5. Evaluation (Molding Compression Rate)

The molding material of each Example and each Comparative Example was subjected to heat compression molding using a flat metal plate of 300 mm×300 mm, thereby producing a flat-plate molded article having a thickness of 4 mm.

The molding was carried out under the following conditions: a mold temperature on the product side and the reverse side of 140° C., a molding pressure of 10 MPa, and a retaining time inside the mold of 420 seconds. Thereafter, the molded article was demolded from the mold, and immediately cooled between the iron plates. Thereafter, the molded article was allowed to stand at 25° C. for 24 hours, and the four sides of the molded article at 25° C. were measured, and the compression rate was measured by the ratio with the size of the above-described flat plate mold. The results are shown in Tables 3 and 4.

The compression rate was evaluated based on the following criteria. The results are shown in Tables 3 and 4.
Evaluation Criteria:
Excellent: compression rate was less than 0.00.
Good: compression rate was 0.00 or more and less than 0.10.
Bad: compression rate was 0.10 or more.

(Flame Retardancy)

A test piece was cut out from the flat-plate molded article used for the molding compression rate measurement, and a flammability test in accordance with UL94 standard (flammability of plastic materials) of UL standard (Underwriters Laboratories Inc.) was carried out. In detail, each of the test pieces with a thickness of 4 mm, 3 mm, and 2.5 mm was evaluated if it satisfied V-0 standard. The results are shown in Tables 3 and 4.

The flame retardancy was evaluated based on the following standard. The results are shown in Tables 3 and 4.
Evaluation Criteria:
Excellent: conformable to V-0 standard (thickness 2 mm).
Good: conformable to V-0 standard (thickness 3 mm).
Bad: not conformable to V-0 standard (thickness 4 mm).
(Linear Expansion Coefficient)

A test piece (4 mm×4 mm×5 mm) was cut out from the flat-plate molded article (a thickness of 4 mm) used for the molding compression rate measurement, and the linear expansion coefficient of the molded article in horizontal direction was measured with a thermomechanical analyzer (manufactured by Hitachi High-Tech Science Corporation, EXSTAR TMA SS7100) using an expansion/compression probe. The temperature was increased at a temperature increase rate of 5° C./min from room temperature to 100° C., and the linear expansion coefficient in the range of 50° C. to 80° C. was measured. The results are shown in Tables 3 and 4.

The difference between the obtained linear expansion coefficient and the linear expansion coefficient of aluminum (23.0 ppm/° C.) is shown in Tables 3 and 4.

The linear expansion coefficient was evaluated based on the following. The results are shown in Tables 3 and 4.
Good: the absolute value of the difference between the obtained linear expansion coefficient and the linear expansion coefficient of aluminum was 0 or more and less than 4.5.
Fair: the absolute value of the difference between the obtained linear expansion coefficient and the linear expansion coefficient of aluminum was 4.5 or more and less than 6.
Bad: the absolute value of the difference between the obtained linear expansion coefficient and the linear expansion coefficient of aluminum was 6 or more.
(Smoke Generation)

In the above-described flame retardancy test, the occurrence of black smoke at the time of burning was visually checked in the V-0 determination test using a test piece with a thickness of 3 mm.

The smoke generation was evaluated based on the following criteria. The results are shown in Tables 3 and 4.
Good: no black smoke generated.
Bad: black smoke generated.
(Density)

A test piece was cut out from the flat plate molded article (a thickness of 4 mm) used for the molding compression rate measurement, and the density was measured in accordance with JIS K6911 (1995). The results are shown in Tables 3 and 4.
(Flexural Properties)

A test piece (a length of 80 mm and a width of 10 mm) was cut out from the flat-plate molded article (a thickness of 4 mm) used for the molding compression rate measurement, and the flexure strength and flexural modulus of elasticity were measured at 23° C. and 90° C. in accordance with JIS K7017 (1999). The results are shown in Tables 3 and 4.

From the results of the measurement of the flexural modulus of elasticity and density, the specific rigidity at 23° C. and 90° C. was calculated by the following formula (1). The results are shown in Tables 3 and 4.

$$\text{Specific rigidity} = (\text{Flexural modulus of elasticity})^{1/3} / (\text{density}) \quad (1)$$

(Tensile Properties)

A test piece was cut out from the flat-plate molded article (a thickness of 4 mm) used for the molding compression rate measurement, and the tensile strength and tensile modulus of elasticity were measured at 23° C. in accordance with JIS K7164 (2005). The results are shown in Tables 3 and 4.

TABLE 1

| | | | | Example No. | | | | | | | | |
|---|---|---|---|---|---|---|---|---|---|---|---|---|
| | | | Unit | Ex. 1 | Ex. 2 | Ex. 3 | Ex. 4 | Ex. 5 | Ex. 6 | Ex. 7 | Ex. 8 | Ex. 9 |
| Unsaturated polyester resin composition | Unsaturated polyester resin | Unsaturated polyester resin of Synthesis Example 1 | Parts by mass | 60 | 50 | 60 | 60 | 60 | 50 | 60 | 60 | 60 |
| | Vinyl ester resin | Vinyl ester resin of Synthesis Example 3 | Parts by mass | 10 | 10 | — | — | 10 | 10 | — | — | 10 |
| | | Vinyl ester resin of Synthesis Example 4 | Parts by mass | — | — | 10 | — | — | — | 10 | — | — |
| | | Vinyl ester resin of Synthesis Example 5 | Parts by mass | — | — | — | 10 | — | — | — | 10 | — |
| | Polymerizable monomer | Styrene | Parts by mass | 10 | 5 | 10 | 10 | 10 | 5 | 10 | 10 | 10 |
| | | Aluminum hydroxide | Parts by mass | 150 | 150 | 150 | 150 | 150 | 150 | 150 | 150 | 250 |
| | Flame retardant | OP1230 (phosphorus-based flame retardant) | Parts by mass | — | — | — | — | — | — | — | — | 15 |
| | Low profile agent | Polyvinyl acetate solution | Parts by mass | — | 15 | — | — | — | 15 | — | — | — |
| | | Saturated polyester resin of Synthesis Example 2 | Parts by mass | — | 20 | — | — | — | 20 | — | — | — |
| | | Polystyrene solution | Parts by mass | 15 | — | 15 | 15 | 15 | — | 15 | 15 | 15 |
| | | Polyethylene powder | Parts by mass | 5 | 0 | 5 | 5 | 5 | 0 | 5 | 5 | 5 |

TABLE 1-continued

|  |  | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| Polymerization inhibitor | P-benzoquinone | Parts by mass | 0.05 | 0.05 | 0.05 | 0.05 | 0.05 | 0.05 | 0.05 | 0.05 | 0.05 |
| Curing agent | T-butyl peroxybenzoate | Parts by mass | 1 | 1 | 1 | 1 | 1 | 1 | 1 | 1 | 1 |
| Release agent | Zinc stearate | Parts by mass | 5 | 5 | 5 | 5 | 5 | 5 | 5 | 5 | 5 |
| Coloring agent | Black polyester toner | Parts by mass | 10 | 10 | 10 | 10 | 10 | 10 | 10 | 10 | 10 |
| Filler | Calcium carbonate | Parts by mass | — | — | — | — | — | — | — | — | — |
| Wetting and dispersing agent | Polyester phosphate | Parts by mass | 1 | 1 | 1 | 1 | 1 | 1 | 1 | 1 | 1 |
| Thickening agent | Magnesium oxide | Parts by mass | 0.8 | 0.8 | 0.8 | 0.8 | 0.8 | 0.8 | 0.8 | 0.8 | 0.8 |
| Reinforced fiber | Glass fiber (fiber length 25 mm) | % | 30 | 30 | 30 | 30 | 35 | 35 | 35 | 35 | 29 |
| Mixing ratio of vinyl ester to 100 parts by mass of unsaturated polyester |  | Parts by mass | 16.7 | 20 | 16.7 | 16.7 | 16.7 | 20 | 16.1 | 16.7 | 16.7 |
| Mixing ratio of aluminum hydroxide to vinyl ester (aluminum hydroxide/vinyl ester) |  | — | 25 | 25 | 25 | 25 | 25 | 25 | 25 | 25 | 42 |
| Volume content rate in molding material | Filler-excluding component | vol % | 51.0 | 50.7 | 50.7 | 50.7 | 47.8 | 47.8 | 47.8 | 47.8 | 46.8 |
|  | Aluminum hydroxide | vol % | 28.3 | 28.5 | 28.5 | 28.5 | 27.2 | 27.2 | 27.2 | 27.2 | 33.3 |
|  | Calcium carbonate (filler) | vol % | — | — | — | — | — | — | — | — | — |
|  | Reinforced fiber | vol % | 20.7 | 20.8 | 20.8 | 20.8 | 24.9 | 24.9 | 24.9 | 24.9 | 19.9 |

TABLE 2

|  |  |  | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Unsaturated polyester resin composition | Unsaturated polyester resin | Unsaturated polyester resin of Synthesis Example 1 | Parts by mass | 67 | 47 | 60 | 60 | 60 | 67 | 67 | 56 |
|  | Vinyl ester resin | Vinyl ester resin of Synthesis Example 3 | Parts by mass | 3 | 23 | 10 | 10 | 10 | 3 | 3 | 14 |
|  |  | Vinyl ester resin of Synthesis Example 4 | Parts by mass | — | — | — | — | — | — | — | — |
|  |  | Vinyl ester resin of Synthesis Example 5 | Parts by mass | — | — | — | — | — | — | — | — |
|  | Polymerizable monomer | Styrene | Parts by mass | 10 | 10 | 10 | 10 | 10 | 10 | 10 | 10 |
|  | Aluminum hydroxide |  | Parts by mass | 150 | 150 | 40 | 320 | — | 150 | 250 | — |
|  | Flame retardant | OP1230 (phosphorus-based flame retardant) | Parts by mass | — | — | — | — | — | — | 15 | — |
|  | Low profile agent | Polyvinyl acetate solution | Parts by mass | — | — | — | — | — | — | — | — |
|  |  | Saturated polyester resin of Synthesis Example 2 | Parts by mass | — | — | — | — | — | — | — | — |
|  |  | Polystyrene solution | Parts by mass | 15 | 15 | 15 | 15 | 15 | 15 | 15 | 15 |
|  |  | Polyethylene powder | Parts by mass | 5 | 5 | 5 | 5 | 5 | 5 | 5 | 5 |
|  | Polymerization inhibitor | P-benzoquinone | Parts by mass | 0.05 | 0.05 | 0.05 | 0.05 | 0.05 | 0.05 | 0.05 | 0.05 |
|  | Curing agent | T-butyl peroxybenzoate | Parts by mass | 1 | 1 | 1 | 1 | 1 | 1 | 1 | 1 |
|  | Release agent | Zinc stearate | Parts by mass | 5 | 5 | 5 | 5 | 5 | 5 | 5 | 5 |
|  | Coloring agent | Black polyester toner | Parts by mass | 10 | 10 | 10 | 10 | 10 | 10 | 10 | 10 |
|  | Filler | Calcium carbonate | Parts by mass | — | — | — | — | 170 | — | — | 84 |
|  | Wetting and dispersing agent | Polyester phosphate | Parts by mass | 1 | 1 | 1 | 1 | 1 | 1 | 1 | 1 |

TABLE 2-continued

|  |  | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|
| Thickening agent | Magnesium oxide | Parts by mass | 0.8 | 0.8 | 0.8 | 0.8 | 0.8 | 0.8 | 0.8 | 0.8 |
| Reinforced fiber | Glass fiber (fiber length 25 mm) | % | 30 | 30 | 32 | 26 | 28 | 35 | 29 | 30 |
| Mixing ratio of vinyl ester to 100 parts by mass of unsaturated polyester |  |  | — | 4.5 | 48.9 | 16.7 | 16.7 | 16.7 | 4.5 | 4.5 | 25 |
| Mixing ratio of aluminum hydroxide to vinyl ester (aluminum hydroxide/vinyl ester) |  |  | — | 83 | 11 | 7 | 53 | — | 83 | 139 | — |
| Volume content rate in molding material | Filler-excluding component | vol % | 50.4 | 50.4 | 68.4 | 35.8 | 50.7 | 48.1 | 46.8 | 63.1 |
|  | Aluminum hydroxide | vol % | 28.7 | 28.7 | 11.4 | 44.0 | — | 27.1 | 33.3 | — |
|  | Calcium carbonate (filler) | vol % | — | — | — | — | 28.9 | — | — | 17.6 |
|  | Reinforced fiber | vol % | 20.9 | 20.9 | 20.2 | 20.2 | 20.4 | 24.8 | 19.9 | 19.4 |

TABLE 3

|  |  |  | Unit | Ex. 1 | Ex. 2 | Ex. 3 | Ex. 4 | Ex. 5 |
|---|---|---|---|---|---|---|---|---|
| Evaluation | Molding compression rate | Compression rate | % | 0.08 | −0.04 | 0.08 | 0.08 | 0.08 |
|  |  | Determination | — | Good | Excellent | Good | Good | Good |
|  | Flame retardant | Determination | — | Good | Good | Good | Good | Good |
|  |  | V-0 standard (thickness of 4 mm) | — | Conformable | Conformable | Conformable | Conformable | Conformable |
|  |  | V-0 standard (thickness of 3 mm) | — | Conformable | Conformable | Conformable | Conformable | Conformable |
|  |  | V-0 standard (thickness of 2 mm) | — | Not conformable | Not conformable | Not conformable | Not conformable | Not conformable |
|  | Linear expansion coefficient | Linear expansion coefficient | ppm/° C. | 19.7 | 19.7 | 19.7 | 19.7 | 19.3 |
|  |  | Absolute value of difference between linear expansion coefficients and that of aluminum | — | 3.3 | 3.3 | 3.3 | 3.3 | 3.7 |
|  |  | Determination | — | Good | Good | Good | Good | Good |
|  | Smoke generation |  | — | Good | Good | Good | Good | Good |
|  | Density |  | g/mL | 1.75 | 1.76 | 1.76 | 1.76 | 1.81 |
|  | Flexural properties (23° C.) | Flexural modulus of elasticity | GPa | 12.6 | 13.0 | 12.0 | 12.2 | 14.1 |
|  |  | Flexure strength | MPa | 231 | 230 | 218 | 207 | 292 |
|  |  | Specific rigidity | (MPa)$^{1/3}$/(g/mL) | 13.3 | 13.4 | 13.0 | 13.1 | 13.4 |
|  | Flexural properties (90° C.) | Flexural modulus of elasticity | GPa | 6.6 | 6.6 | 6.0 | 6.0 | 7.1 |
|  |  | Flexure strength | MPa | 143 | 145 | 119 | 131 | 155 |
|  |  | Specific rigidity | (MPa)$^{1/3}$/(g/mL) | 10.7 | 10.7 | 10.3 | 10.3 | 10.6 |
|  | Tensile properties | Tensile modulus of elasticity | GPa | 12.7 | 13.0 | 11.9 | 11.9 | 13.9 |
|  |  | Tensile strength | MPa | 113 | 114 | 105 | 103 | 143 |

|  |  |  | Unit | Ex. 6 | Ex. 7 | Ex. 8 | Ex. 9 |
|---|---|---|---|---|---|---|---|
| Evaluation | Molding compression rate | Compression rate | % | −0.04 | 0.08 | 0.08 | 0.08 |
|  |  | Determination | — | Excellent | Good | Good | Good |
|  | Flame retardant | Determination | — | Good | Good | Good | Excellent |
|  |  | V-0 standard (thickness of 4 mm) | — | Conformable | Conformable | Conformable | Conformable |
|  |  | V-0 standard (thickness of 3 mm) | — | Conformable | Conformable | Conformable | Conformable |

TABLE 3-continued

|  |  |  |  |  |  |  |
|---|---|---|---|---|---|---|
|  | V-0 standard (thickness of 2 mm) | — | — | Not conformable | Not conformable | Not conformable | Conformable |
| Linear expansion coefficient | Linear expansion coefficient | ppm/° C. | 19.3 | 19.3 | 19.3 | 18.6 |
|  | Absolute value of difference between linear expansion coefficients and that of aluminum | — | 3.7 | 3.7 | 3.7 | 4.4 |
|  | Determination | — | Good | Good | Good | Good |
| Smoke generation |  | — | Good | Good | Good | Good |
| Density |  | g/mL | 1.81 | 1.81 | 1.81 | 1.74 |
| Flexural properties (23° C.) | Flexural modulus of elasticity | GPa | 13.9 | 12.6 | 12.8 | 11.9 |
|  | Flexure strength | MPa | 299 | 270 | 273 | 203 |
|  | Specific rigidity | (MPa)$^{1/3}$/(g/mL) | 13.3 | 12.9 | 12.9 | 13.1 |
| Flexural properties (90° C.) | Flexural modulus of elasticity | GPa | 7.2 | 6.7 | 6.7 | 5.9 |
|  | Flexure strength | MPa | 155 | 136 | 143 | 130 |
|  | Specific rigidity | (MPa)$^{1/3}$/(g/mL) | 10.7 | 10.4 | 10.4 | 10.4 |
| Tensile properties | Tensile modulus of elasticity | GPa | 13.8 | 12.7 | 12.8 | 12.0 |
|  | Tensile strength | MPa | 142 | 131 | 129 | 102 |

TABLE 4

|  |  |  |  | Comparative Example No. ||||| 
|---|---|---|---|---|---|---|---|---|
|  |  |  | Unit | Comp. Ex. 1 | Comp. Ex. 2 | Comp. Ex. 3 | Comp. Ex. 4 | Comp. Ex. 5 |
| Evaluation | Molding compression rate | Compression rate | % | 0.08 | 0.15 | 0.12 | 0.06 | 0.07 |
|  |  | Determination | — | Good | Bad | Bad | Good | Good |
|  | Flame retardant | Determination | — | Good | Good | Bad | Good | Bad |
|  |  | V-0 standard (thickness of 4 mm) | — | Conformable | Conformable | Not conformable | Conformable | Not conformable |
|  |  | V-0 standard (thickness of 3 mm) | — | Conformable | Conformable | Not conformable | Conformable | Not conformable |
|  |  | V-0 standard (thickness of 2 mm) | — | Not conformable | Not conformable | Not conformable | Not conformable | Not conformable |
|  | Linear expansion coefficient | Linear expansion coefficient | ppm/° C. | 19.7 | 19.7 | 26 | 14 | 15.6 |
|  |  | Absolute value of difference between linear expansion coefficients and that of aluminum | — | 3.3 | 3.3 | −3.0 | 9 | 7.4 |
|  |  | Determination | — | Good | Good | Good | Bad | Bad |
|  | Smoke generation |  | — | Good | Good | Good | Good | Good |
|  | Density |  | g/mL | 1.77 | 1.77 | 1.60 | 1.97 | 1.85 |
|  | Flexural properties (23° C.) | Flexural modulus of elasticity | GPa | 11.0 | 13.3 | 10.9 | 12.1 | 11.9 |
|  |  | Flexure strength | MPa | 202 | 236 | 217 | 217 | 185 |
|  |  | Specific rigidity | (MPa)$^{1/3}$/(g/mL) | 12.6 | 13.4 | 13.9 | 11.7 | 12.3 |
|  | Flexural properties (90° C.) | Flexural modulus of elasticity | GPa | 5.7 | 6.8 | 8.8 | 9.0 | 9.7 |
|  |  | Flexure strength | MPa | 126 | 149 | 142 | 138 | 148 |
|  |  | Specific rigidity | (MPa)$^{1/3}$/(g/mL) | 10.1 | 10.7 | 12.9 | 10.6 | 11.5 |
|  | Tensile properties | Tensile modulus of elasticity | GPa | 11.0 | 13.3 | 11.0 | 12.2 | 12.6 |
|  |  | Tensile strength | MPa | 102 | 117 | 109 | 110 | 74 |

TABLE 4-continued

|  |  |  |  | Comparative Example No. | | |
|---|---|---|---|---|---|---|
|  |  |  | Unit | Comp. Ex. 6 | Comp. Ex. 7 | Comp. Ex. 8 |
| Evaluation | Molding compression rate | Compression rate | % | 0.08 | 0.08 | 0.13 |
|  |  | Determination | — | Good | Good | Bad |
|  | Flame retardant | Determination | — | Good | Excellent | Bad |
|  |  | V-0 standard (thickness of 4 mm) | — | Conformable | Conformable | Not conformable |
|  |  | V-0 standard (thickness of 3 mm) | — | Conformable | Conformable | Not conformable |
|  |  | V-0 standard (thickness of 2 mm) | — | Not conformable | Conformable | Not conformable |
|  | Linear expansion coefficient | Linear expansion coefficient | ppm/°C. | 19.7 | 18.6 | 17.1 |
|  |  | Absolute value of difference between linear expansion coefficients and that of aluminum | — | 3.3 | 4.4 | 5.9 |
|  |  | Determination | — | Good | Good | Fair |
|  | Smoke generation |  | — | Good | Good | Good |
|  | Density |  | g/mL | 1.80 | 1.74 | 1.65 |
|  | Flexural properties (23° C.) | Flexural modulus of elasticity | GPa | 11.2 | 10.3 | 8.7 |
|  |  | Flexure strength | MPa | 253 | 179 | 140 |
|  |  | Specific rigidity | $(MPa)^{1/3}/(g/mL)$ | 12.4 | 12.5 | 12.5 |
|  | Flexural properties (90° C.) | Flexural modulus of elasticity | GPa | 6.0 | 5.0 | 6.9 |
|  |  | Flexure strength | MPa | 127 | 111 | 108 |
|  |  | Specific rigidity | $(MPa)^{1/3}/(g/mL)$ | 10.1 | 9.8 | 11.6 |
|  | Tensile properties | Tensile modulus of elasticity | GPa | 11.6 | 10.0 | 9.0 |
|  |  | Tensile strength | MPa | 120 | 102 | 65 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The unsaturated polyester resin composition, molding material, and molded article of the present invention are suitably used for building materials, housings, casting materials, machine components (such as a battery pack housing for electric vehicles), electronic or electric components, and each component of, for example, a vehicle, a ship, or an airplane.

The invention claimed is:

1. A unsaturated polyester resin composition comprising:
   an unsaturated polyester;
   a vinyl ester;
   a polymerizable monomer; and
   an aluminum hydroxide,
   wherein the vinyl ester is a reaction product of an epoxy resin and an unsaturated monobasic acid,
   a mixing ratio of the vinyl ester to 100 parts by mass of the unsaturated polyester is 5 parts by mass or more and 20 parts by mass or less,
   a mass ratio of the aluminum hydroxide to the vinyl ester is 22 or more and 45 or less,
   the epoxy resin is a bisphenol epoxy resin, and
   an epoxy equivalent of the epoxy resin is 250 g/eq or more and 350 g/eq or less.

2. The unsaturated polyester resin composition according to claim 1, wherein the epoxy resin is a bisphenol A epoxy resin.

3. The unsaturated polyester resin composition according to claim 1, further comprising a flame retardant.

4. A molding material comprising:
   the unsaturated polyester resin composition according to claim 1; and
   a reinforced fiber.

5. A molded article comprising:
   a cured product of the molding material according to claim 4.

* * * * *